(12) United States Patent
Jacobsen et al.

(10) Patent No.: US 10,288,359 B2
(45) Date of Patent: May 14, 2019

(54) NET-SHAPE STRUCTURE WITH MICRO-TRUSS CORE

(71) Applicant: HRL LABORATORIES, LLC, Malibu, CA (US)

(72) Inventors: Alan J. Jacobsen, Woodland Hills, CA (US); Tobias A. Schaedler, Oak Park, CA (US); Christopher S. Roper, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 215 days.

(21) Appl. No.: 15/348,812

(22) Filed: Nov. 10, 2016

(65) Prior Publication Data

US 2017/0059256 A1   Mar. 2, 2017

Related U.S. Application Data

(62) Division of application No. 13/312,952, filed on Dec. 6, 2011, now Pat. No. 9,539,773.

(51) Int. Cl.
*B21C 37/00* (2006.01)
*F28F 1/40* (2006.01)
(Continued)

(52) U.S. Cl.
CPC ............... *F28F 1/40* (2013.01); *B29C 35/08* (2013.01); *B29C 35/0894* (2013.01); *B29C 53/00* (2013.01); *B29C 64/129* (2017.08); *B29C 71/02* (2013.01); *B33Y 10/00* (2014.12); *B33Y 80/00* (2014.12); *C23C 18/1233* (2013.01);
(Continued)

(58) Field of Classification Search
None
See application file for complete search history.

(56) References Cited

U.S. PATENT DOCUMENTS 4,219,597 A   8/1980  Maistre
4,399,020 A   8/1983  Branchick et al.
(Continued)

FOREIGN PATENT DOCUMENTS

CN   1464934 A   12/2003
CN   101814614 A   8/2010
(Continued)

OTHER PUBLICATIONS

English translation of Chinese Office action for Chinese Patent Application No. 201280060393.4, dated Jul. 3, 2015, 9 pages.
(Continued)

*Primary Examiner* — Seth Dumbris
(74) *Attorney, Agent, or Firm* — Lewis Roca Rothgerber Christie, LLP

(57) ABSTRACT

A curved, three-dimensional, ordered micro-truss structure including a series of first struts extending along a first direction, a series of second struts extending along a second direction, and a series of third struts extending along a third direction. The first, second, and third struts interpenetrate one another at a series of nodes. The series of first struts, second struts, third struts, and nodes form a series of ordered unit cells within the micro-truss structure. The series of ordered unit cells define a curved surface.

18 Claims, 13 Drawing Sheets
(8 of 13 Drawing Sheet(s) Filed in Color)

(51) Int. Cl.

| | | |
|---|---|---|
| *C25D 5/08* | (2006.01) | |
| *B29C 35/08* | (2006.01) | |
| *B29C 71/02* | (2006.01) | |
| *C25D 1/08* | (2006.01) | |
| *C23C 18/12* | (2006.01) | |
| *C23C 18/16* | (2006.01) | |
| *B29C 53/00* | (2006.01) | |
| *B33Y 10/00* | (2015.01) | |
| *B33Y 80/00* | (2015.01) | |
| *C23C 18/38* | (2006.01) | |
| *F28F 1/02* | (2006.01) | |
| *B29C 64/129* | (2017.01) | |

(52) U.S. Cl.
CPC ...... *C23C 18/1254* (2013.01); *C23C 18/1641* (2013.01); *C23C 18/1653* (2013.01); *C23C 18/1657* (2013.01); *C23C 18/38* (2013.01); *C25D 1/08* (2013.01); *C25D 5/08* (2013.01); *F28F 1/025* (2013.01); *B29C 2035/0827* (2013.01); *B29C 2071/022* (2013.01); *Y10T 428/12347* (2015.01); *Y10T 428/249953* (2015.04); *Y10T 428/249991* (2015.04)

(56) References Cited

U.S. PATENT DOCUMENTS

| | | |
|---|---|---|
| 4,400,421 A | 8/1983 | Stover |
| 4,568,595 A | 2/1986 | Morris |
| 4,575,330 A | 3/1986 | Hull |
| 4,722,089 A | 1/1988 | Botez et al. |
| 4,815,386 A | 3/1989 | Dillard et al. |
| 5,006,937 A | 4/1991 | Nonoshita et al. |
| 5,185,297 A | 2/1993 | Park et al. |
| 5,265,185 A | 11/1993 | Ashley |
| 5,394,490 A | 2/1995 | Kato et al. |
| 5,401,694 A | 3/1995 | Gesing et al. |
| 5,402,514 A | 3/1995 | Booth et al. |
| 5,932,397 A | 8/1999 | Mustacich |
| 5,938,845 A | 8/1999 | Ang |
| 5,954,898 A | 9/1999 | McKague et al. |
| 6,176,874 B1 | 1/2001 | Vacanti et al. |
| 6,274,288 B1 | 8/2001 | Kewitsch et al. |
| 6,341,190 B1 | 1/2002 | Summersgill et al. |
| 6,379,962 B1 | 4/2002 | Holy et al. |
| 6,387,593 B1 | 5/2002 | Kewitsch et al. |
| 6,472,210 B1 | 10/2002 | Holy et al. |
| 6,500,401 B2 | 12/2002 | Reznek et al. |
| 6,510,260 B2 | 1/2003 | Chen et al. |
| 6,592,787 B2 | 7/2003 | Pickrell et al. |
| 6,631,231 B2 | 10/2003 | Mizuuchi et al. |
| 6,650,817 B2 | 11/2003 | Murali |
| 6,660,192 B1 | 12/2003 | Kim et al. |
| 6,670,039 B1 | 12/2003 | Nagle et al. |
| 6,684,007 B2 | 1/2004 | Yoshimura et al. |
| 6,823,116 B2 | 11/2004 | Inui et al. |
| 6,862,393 B2 | 3/2005 | Nashimoto |
| 6,870,976 B2 | 3/2005 | Chen et al. |
| 6,875,442 B2 | 4/2005 | Holy et al. |
| 6,879,757 B1 | 4/2005 | Zhou et al. |
| 6,887,809 B1 | 5/2005 | Adler |
| 6,898,362 B2 | 5/2005 | Forbes et al. |
| 6,925,233 B2 | 8/2005 | Inui et al. |
| 6,932,880 B2 | 8/2005 | Inui et al. |
| 6,941,888 B2 | 9/2005 | Barsoum |
| 6,952,504 B2 | 10/2005 | Bi et al. |
| 6,993,235 B2 | 1/2006 | Takagi et al. |
| 6,993,406 B1 | 1/2006 | Cesarano, III et al. |
| 7,006,747 B2 | 2/2006 | Escuti et al. |
| 7,014,661 B2 | 3/2006 | Blunn et al. |
| 7,020,374 B2 | 3/2006 | Talin et al. |
| 7,022,522 B2 | 4/2006 | Guan et al. |
| 7,024,093 B2 | 4/2006 | Shelnut et al. |
| 7,085,467 B2 | 8/2006 | Ikemoto et al. |
| 7,209,622 B2 | 4/2007 | Hoshi et al. |
| 7,382,959 B1 | 6/2008 | Jacobsen |
| 7,421,159 B2 | 9/2008 | Yang et al. |
| 7,531,120 B2 | 5/2009 | Van Rijn et al. |
| 7,609,922 B2 | 10/2009 | Aoki et al. |
| 7,653,276 B1 | 1/2010 | Gross et al. |
| 7,653,279 B1 | 1/2010 | Jacobsen |
| 7,687,132 B1 | 3/2010 | Gross et al. |
| 7,901,462 B2 | 3/2011 | Yang et al. |
| 7,938,989 B1 | 5/2011 | Gross et al. |
| 8,268,510 B2 | 9/2012 | Rock et al. |
| 8,453,717 B1 | 6/2013 | Roper et al. |
| 2004/0021237 A1 | 2/2004 | Shimizu et al. |
| 2004/0123980 A1* | 7/2004 | Queheillalt ........... C23C 14/046 165/133 |
| 2004/0145967 A1 | 7/2004 | Honda |
| 2004/0154252 A1 | 8/2004 | Sypeck et al. |
| 2004/0200417 A1 | 10/2004 | Hanawa et al. |
| 2004/0253365 A1 | 12/2004 | Warren et al. |
| 2004/0264863 A1 | 12/2004 | Suzuki et al. |
| 2005/0115186 A1 | 6/2005 | Jensen et al. |
| 2005/0135745 A1 | 6/2005 | Greiner et al. |
| 2005/0202206 A1 | 9/2005 | Wadley et al. |
| 2005/0221156 A1 | 10/2005 | McLean et al. |
| 2005/0224449 A1 | 10/2005 | Hsieh et al. |
| 2005/0255289 A1 | 11/2005 | Wadley |
| 2005/0287696 A1 | 12/2005 | Dumais et al. |
| 2006/0029348 A1 | 2/2006 | Kempen et al. |
| 2006/0029349 A1 | 2/2006 | Hoshi et al. |
| 2006/0080835 A1 | 4/2006 | Kooistra et al. |
| 2007/0196066 A1 | 8/2007 | Wang et al. |
| 2007/0235170 A1 | 10/2007 | Zinck et al. |
| 2007/0247714 A1 | 10/2007 | Schnieper et al. |
| 2010/0124659 A1 | 5/2010 | Neon et al. |
| 2010/0159303 A1 | 6/2010 | Rock et al. |
| 2010/0300669 A1 | 12/2010 | Jacobsen et al. |

FOREIGN PATENT DOCUMENTS

| | | |
|---|---|---|
| CN | 201580542 U | 9/2010 |
| JP | 56-169764 | 12/1981 |
| JP | 2001312044 A | 11/2001 |
| WO | WO 2005/014216 A2 | 2/2005 |
| WO | WO 2010/141176 A2 | 12/2010 |

OTHER PUBLICATIONS

Extended European Search Report for Application No. 12856497.8, dated Jul. 6, 2015, 9 pages.

Jacobsen et al., "Micro-scale truss structures with three-filed and six-fold symmetry formed from self-propagating polymer waveguides," Acta Materialia, 56:2540-2548, 2008.

International Search Report and Written Opinion for PCT/US2012/030414 dated Jul. 9, 2012, 6 pages.

Kewitsch et al., "Nonlinear Optical Properties of Photoresists for Projection Lithography", Applied Physics Letters, Jan. 22, 1996, 455-457, vol. 68 (No. 4), USA.

Shoji et al., "Optically-Induced Growth of Fiber Patterns into a Photopolymerizable Resin", Applied Physics Letters, Aug. 2, 1999, 737-739, vol. 75 (No. 5), USA.

Kagami et al., "Light-Induced Self-Written Three-Dimensional Optical Waveguide", Applied Physics Letters, Aug. 20, 2001, 1079-1081, vol. 79 (No. 8), USA.

Bertsch et al., "Microstereolithography: A Review", Materials Research Society Symposium Proceedings, 2003, 1-13, vol. 758, USA.

Sun et al., "Two-Photon Photo Polymerization and 3D Lithographic Microfabrication", APS, 2004, 169-273, vol. 170, USA.

Chuang et al., "A New Method to Fabricate Polymer Waveguides", Progress in Electromagnetics Research Symposium, Aug. 22-26, 2005, 92-95, Hangzhou, China.

Jang et al., "3D Polymer Microframes That Exploit Length-Scale-Dependent Mechanical Behavior", Advanced Materials, 2006, 2123-2127, vol. 18.

U.S. Pat. No. 7,382,959 B1, Issued Jun. 3, 2008, entitled "Optically Oriented Three-Dimensional Polymer Microstructures", Application, Office Actions and Notice of Allowance.

(56) References Cited

OTHER PUBLICATIONS

U.S. Pat. No. 7,653,276 B1; Issued Jan. 26, 2010; entitled "Composite Structures for Storing Thermal Energy", Application, Office Actions and Notice of Allowance.
U.S. Pat. No. 7,687,132 B1, Issued Mar. 30, 2010, entitled "Ceramic Microtruss", Application, Office Actions and Notice of Allowance.
U.S. Pat. No. 7,653,279 B1, Issued Jan. 26, 2010, entitled "Optically Oriented Three-Dimensional Polymer Microstructures", Application, Office Actions and Notice of Allowance.
U.S. Pat. No. 7,938,989 B1, Issued May 10, 2011, entitled "Composite Structures for Storing Thermal Energy", Application, Office Actions and Notice of Allowance.
U.S. Pat. No. 8,197,930, Issued Jun. 12, 2012, entitled "Three-Dimensional Ordered Open-Cellular Structures", Application, Office Actions and Notice of Allowance.
U.S. Appl. No. 13/428,348, filed Mar. 23, 2012, entitled "High Airflow Micro-Truss Structural Apparatus," Application.
USPTO Notice of Allowance for related U.S. Appl. No. 12/109,262, filed Apr. 24, 2008, dated Dec. 28, 2011, 7 pages.
USPTO Notice of Allowance for related U.S. Appl. No. 12/109,262, filed Apr. 24, 2008, dated Jun. 21, 2012, 11 pages.
USPTO Office Action for related U.S. Appl. No. 12/109,262, filed Apr. 24, dated Jul. 6, 2011, 14 pages.
USPTO Restriction Requirement for related U.S. Appl. No. 12/109,262, filed Apr. 24, 2008, dated Mar. 21, 2011, 6 pages.
Jacobsen, et al "Interconnected Self-Propagating Photopolymer Waveguides: An Alternative to Stereolithography for Rapid Formation of Lattice-Based Open-Cellular Materials", Twenty First Annual International Solid Freeform Fabrication Symposium—An Additive Manufacturing Conference (Aug. 2010), pp. 846-853.
Evans, et al "Concepts for enhanced energy absorption using hollow micro-lattices", International Journal of Impact Engineering, 37 (2010) pp. 947-959.
Lian, et al "Catastrophic vs Gradual Collapse of Thin-Walled Nanocrystalline Ni Hollow Cylinders As Building Blocks of Microlattice Structures", Nano Letters, Aug. 2011, 11, pp. 4118-4125.

* cited by examiner

US 10,288,359 B2

NET-SHAPE STRUCTURE WITH MICRO-TRUSS CORE

CROSS-REFERENCE TO RELATED APPLICATION(S)

The present application is a divisional of U.S. patent application Ser. No. 13/312,952, filed Dec. 6, 2011, entitled "NET-SHAPE STRUCTURE WITH MICRO-TRUSS CORE", the entire content of which is incorporated herein by reference.

FIELD

Aspects of embodiments of the present invention relates to a three-dimensional (3D) structure and a method of forming the same.

BACKGROUND

Lightweight sandwich structures (e.g., a structure including a core "sandwiched" between two facesheets) are used for a variety of purposes including heat exchange, advanced armor applications, high impact/low weight applications, etc. In some embodiments, it may be beneficial to form lightweight sandwich structures into particular curvatures that conform to a surface where the material will be used. In some instances, forming a sandwich structure into a particular shape may require costly manufacturing techniques.

Generally, the materials used for lightweight sandwich structures dictate how the structure is formed and whether it can be formed to have complex curvatures. Existing materials used as cores for lightweight sandwich structures include foams, honeycomb, and metal lattice structures. Each of these materials has limitations in its ability to conform to particular curvatures.

Foams can be either open-cellular or closed cellular and are available in a variety of materials including, but not limited to, polymers, metals, and ceramics. Open-cellular foams generally have limited strength and stiffness, which limits their usefulness in a variety of applications. Open-cellular foams also have tortuous, non-uniform paths for fluid flow, in which high pressures are often used to force fluid through the structure. Closed-cellular foams have greater strength and rigidity than open-cellular foams, making them more suitable as cores for sandwich structures. However, closed-cellular foams do not permit fluid to freely flow through the material, which limits their usefulness in applications where fluid flow is required, such as heat transfer applications. Generally, machining is used to form foam into a particular curvature.

Honeycomb structures are also available in a number of different materials including, but not limited to, aluminum, Nomex®, and thermoplastic polymers. Generally, honeycomb structures are closed-cellular. In order to achieve a particular curvature with a honeycomb structure a specific corresponding unit cell shape is generally used. This approach may work for a structure requiring a single radius of curvature; however, it is less effective for complex curvatures which have more than one radius of curvature.

Metallic lattice structures have good strength and stiffness properties and may also function as fluid heat exchanges because the structures allow low pressure drop fluid flow through the material. However, to form a metal lattice structure into a particular curvature, the structure is generally plastically deformed or machined.

As such, there is a need for a lightweight structure that can be easily formed to have a particular curvature without resorting to pre- or post-production manufacturing, which may be expensive or may damage the structural integrity of the sandwich structure.

SUMMARY

Aspects of embodiments of the present invention are directed toward patterning one or more polymer waveguides (or "struts") to form a three-dimensional, curved (or "net-shape"), ordered micro-truss structure (or "micro-truss") having a curvature and/or a system and method to fabricate the one or more polymer waveguides where the three-dimensional micro-truss has a structure that comprises a curvature.

According to one embodiment of the present invention, curved, a three-dimensional, ordered micro-truss structure includes: a plurality of first struts extending along a first direction; a plurality of second struts extending along a second direction; a plurality of third struts extending along a third direction, wherein the plurality of first struts, second struts, third struts, and nodes form a plurality of ordered unit cells within the micro-truss structure, and wherein the plurality of ordered unit cells define a curved surface.

The pluralities of first struts, second struts, and third struts may include a polymer.

The curved, three-dimensional, ordered micro-truss structure may include a coating on the surface of the pluralities of first struts, second struts, and third struts.

The coating may include a material selected from the group consisting of nickel (Ni), copper (Cu), gold (Au), silver (Ag), ruthenium (Ru), platinum (Pt), rhodium (Rh), cobalt (Co), iron (Fe), zinc (Zn), titanium (Ti), aluminum (Al), and combinations thereof.

The curved, three-dimensional, ordered micro-truss structure may further include a facesheet coupled to a side of the plurality of ordered unit cells.

The facesheet may include a metal.

The plurality of ordered unit cells may be coated with a metal to form a metallic connection between the facesheet and the plurality of ordered unit cells.

The first struts, second struts, third struts, and nodes may include a material selected from the group consisting of metal, ceramic, polymer, graphite, and combinations thereof.

The first struts, second struts, third struts, and nodes may include substantially hollow tubes.

According to one embodiment of the present invention, a method of manufacturing a curved (or "net-shape"), three-dimensional, ordered micro-truss structure includes: providing a volume of a photo-monomer; providing a mask between at least one collimated light source and the volume of the photo-monomer, the mask having a plurality of apertures; directing a collimated light beam from the at least one collimated light source to the mask for a period of exposure time, a portion of the collimated light beam passing through the apertures of the mask and into the photo-monomer to form a plurality of polymer waveguides through a portion of the volume of the photo-monomer; removing any uncured photo-monomer to leave behind a partially cured, three-dimensional, ordered, micro-truss structure including a plurality of ordered unit cells, the partially cured, three-dimensional, micro-truss, ordered, micro-truss structure defining an open volume; heating the partially cured, three-dimensional, ordered micro-truss structure above its glass transition temperature; elastically deforming the partially cured, three-dimensional, ordered, micro-truss structure into a curved (or "net-shape") surface; and thermally post-curing the partially cured, curved, three-dimensional, ordered micro-truss structure to form the cured, curved, three-dimensional, ordered micro-truss structure.

The method may occur further include applying a coating to the plurality of ordered unit cells.

The coating applied may include a material selected from the group consisting of nickel (Ni), copper (Cu), gold (Au), silver (Ag), ruthenium (Ru), platinum (Pt), rhodium (Rh), cobalt (Co), iron (Fe), zinc (Zn), titanium (Ti), aluminum (Al) and combinations thereof.

The applying the coating to the plurality of ordered unit cells may include electroplating a metal coating onto the plurality of ordered unit cells The applying the coating to the plurality of ordered unit cells may include electroless plating a metal coating onto the ordered unit cells.

The method may further include removing the polymer waveguides from the curved (or "net-shape"), three-dimensional, ordered micro-truss structure after the coating is applied to the plurality of ordered unit cells.

The method may further include attaching a faceplate to a side of the plurality of ordered unit cells.

The attaching the faceplate to the side of the plurality of ordered unit cells occurs before the deforming the partially cured, three-dimensional, ordered micro-truss structure into a curved (or "net shape") surface.

The attaching the faceplate to the side of the plurality of ordered unit cells occurs after the elastically deforming the three-dimensional, ordered micro-truss structure into a curved (or "net-shape") surface.

The method may further include electroplating a metal coating to the curved, three-dimensional, ordered micro-truss structure after attaching the faceplate to a side of the curved, three-dimensional, ordered micro-truss structure.

The method may further include electroless plating a metal coating to the curved, three-dimensional, ordered micro-truss structure after attaching the faceplate to a side of the micro-truss structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1B:
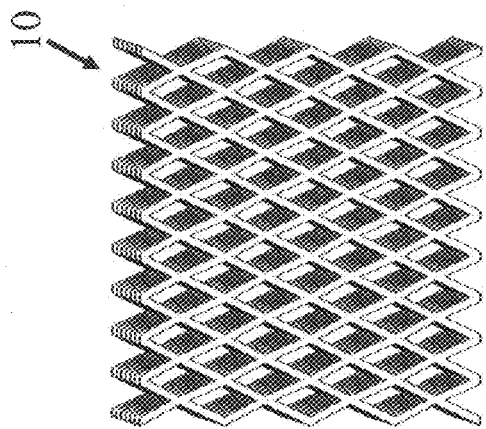
FIG. 1b is a perspective view of a micro-truss structure according to one embodiment of the present invention.
Figure 1C:
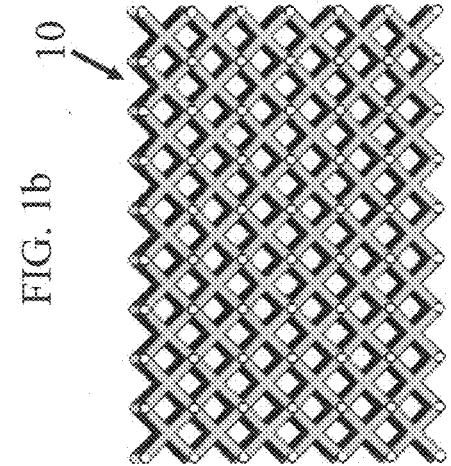
FIG. 1c is a perspective view of a micro-truss structure according to another embodiment of the present invention.
Figure 1A:
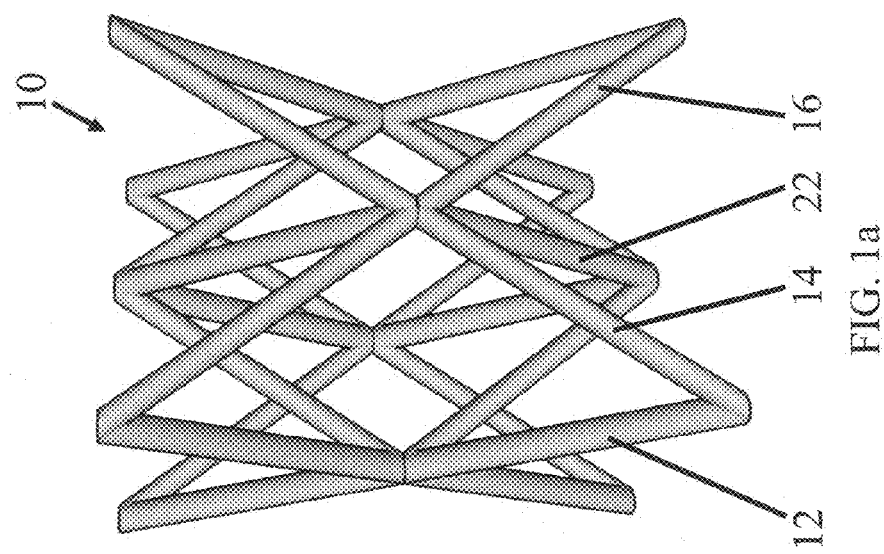
FIG. 1a is a perspective view of an ordered unit cell in a micro-truss structure according to one embodiment of the present invention.
Figure 1D:
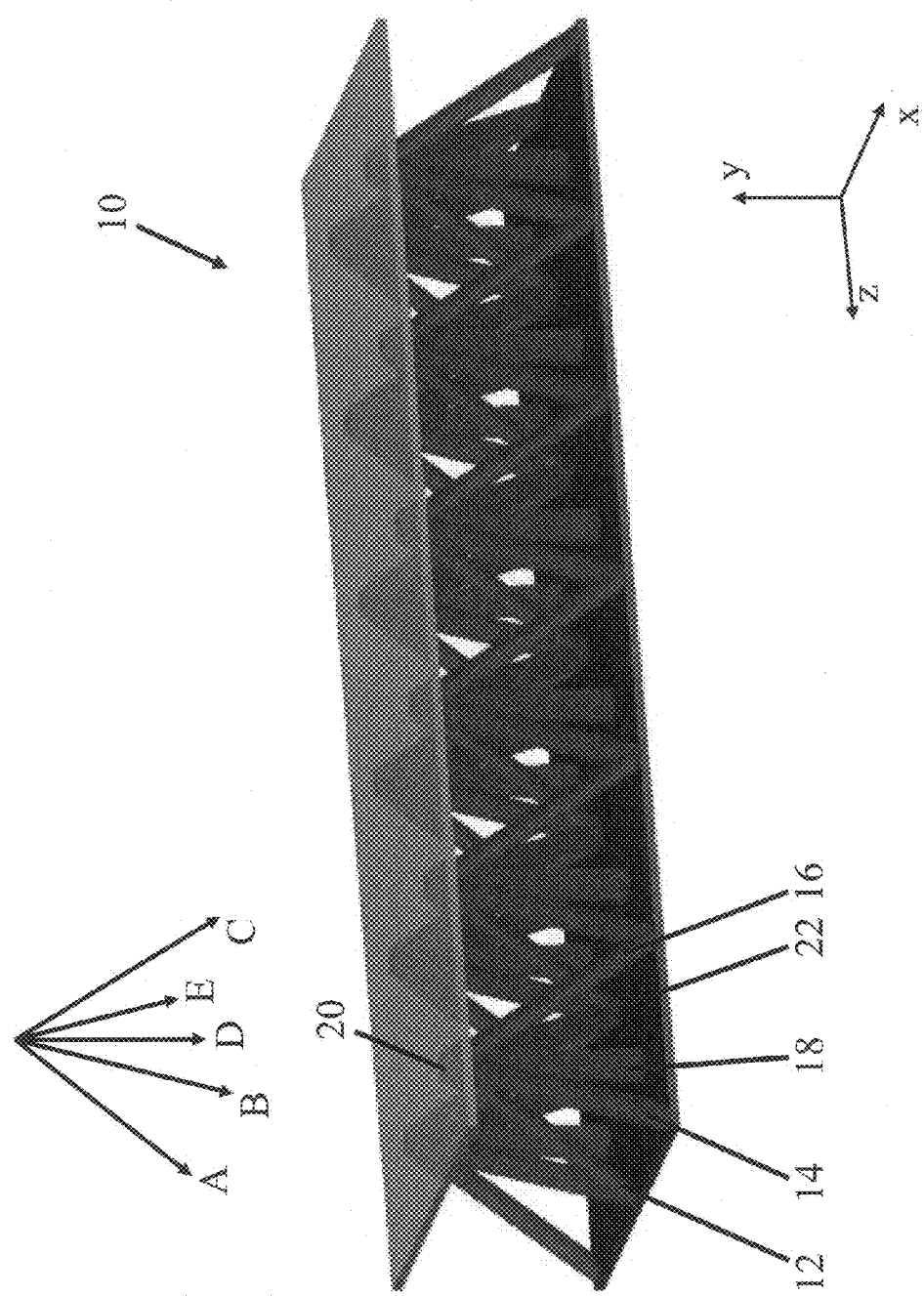
FIG. 1d is a perspective view of a micro-truss structure according to another embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Figure 2A:
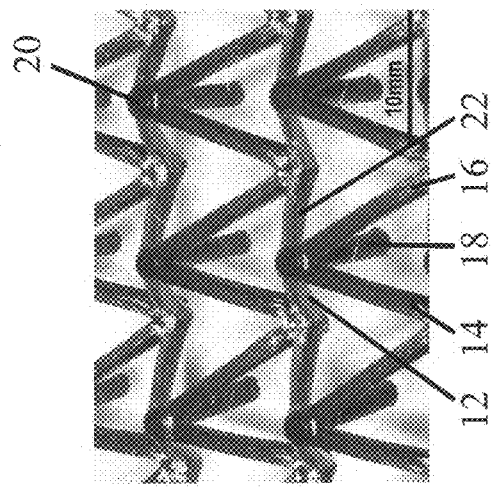
FIG. 2a is a perspective view of four angled struts and one vertical strut intersecting at a node according to one embodiment of the present invention.
Figure 2B:
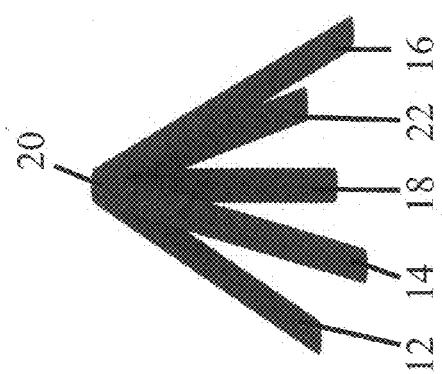
FIG. 2b is a photograph of a micro-truss structure according to one embodiment of the present invention.
Figure 2C:
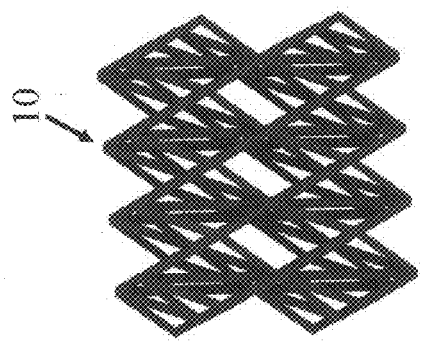
FIG. 2c is a perspective view of a micro-truss structure including a plurality of angled and vertical struts according to one embodiment of the present invention.

Referring to FIGS. 1a, 1b, 1c, 1d, 2a, 2b, and 2c, a three-dimensional, curved (or "net-shape"), ordered micro-truss structure 10 according to an embodiment of the present invention is a self-supporting structure. The micro-truss structure 10 includes a plurality of angled struts (which may also be referred to as angled "truss elements," "truss members," or "polymer waveguides") including first angled struts 12, second angled struts 14, and third angled struts 16, which extend along a first direction A, a second direction B, and a third direction C, respectively. The micro-truss 10 may also include vertical struts 18, which extend along a vertical direction D. With reference to FIGS. 1, 2a, and 2b, the first, second, and third angled struts 12, 14, 16 and the vertical struts 18 interpenetrate each other at nodes 20 to form a continuous material with a three-dimensional microstructure order. In some embodiments, the micro-truss further includes fourth angled struts 22 which extend along a fourth direction E and which also interpenetrate with the first, second, and third angled struts 12, 14, and 16 and the vertical struts 18 at nodes 20.

Single micro-truss unit cells and structures including many ordered unit cells according to embodiments of the present invention are shown in FIGS. 1*a*, 1*b*, 1*c*, and 1*d*. FIG. 2*a* depicts a unit cell comprised of struts 12, 14, 16, 18, and 22 and node 20. In many embodiments, a plurality of ordered unit cells will comprise a micro-truss structure 10. Unit cells are ordered when they are formed in repeating patterns within a micro-truss structure. These ordered unit cells are only some of many possible unit cell architectures that could be utilized for this application. Examples of additional possible ordered unit cell architectures include, but are not limited to, structures described in Jacobsen et al, Acta Materialia 56 (2008) 2540-254, the entire content of which is incorporated herein by reference.

The struts 12, 14, 16, and 18 may include a photo-polymer material. The struts 12, 14, 16, and 18 may be polymer optical waveguides.

The continuous material may be continuously formed such that it lacks any interior boundaries, e.g., boundaries within the interpenetrating portions of struts 12, 14, 16, and 18. Each node 20 of the micro-truss structure 10 may be formed of the continuous material.

According to one embodiment of the present invention, the micro-truss 10 is formed by using a fixed light input (collimated UV light) to cure (polymerize) polymer optical waveguides, which can self-propagate in a 3D pattern. As such, the propagated polymer optical waveguides form the micro-truss structure 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with substantially the same cross-sectional dimensions along its entire length.

According to one embodiment of the present invention, a mask with a two-dimensional pattern of apertures 340 (see FIGS. 4*a* and 4*b*) is used with a light source and photo-monomer to create an ordered 3D polymer micro-truss structure (or an open-cell polymer micro-truss structure).

Figure 3A:
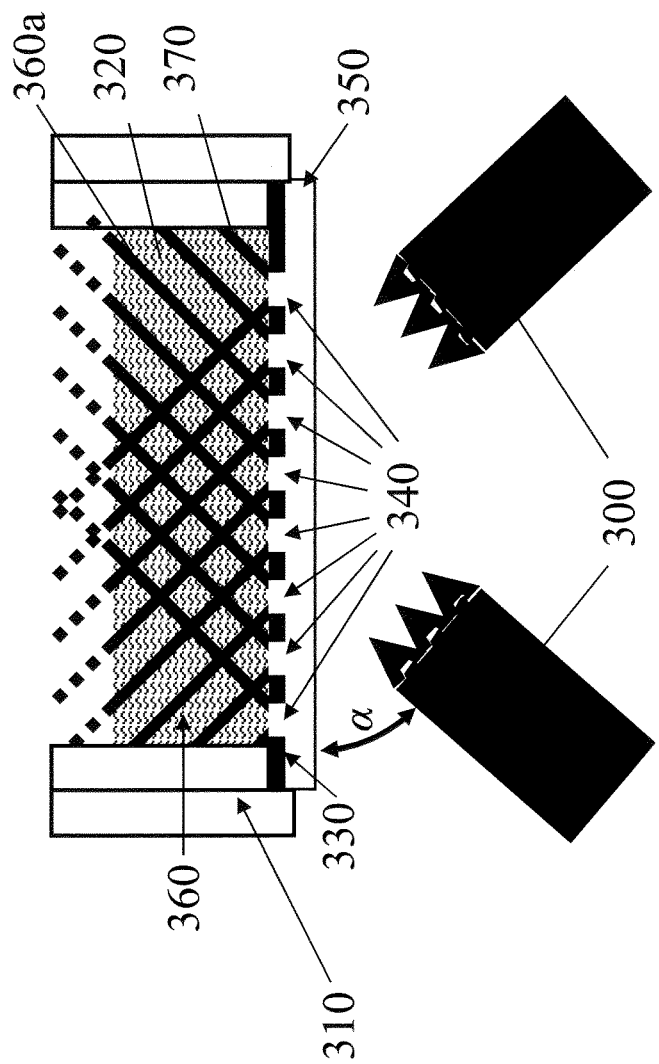
FIGS. 3a and 3b are schematic cross-sectional diagrams of a system for forming a structure from multiple waveguides created using a single collimated beam or multiple collimated beams passing through multiple apertures located at the bottom of the channel in both angled and vertical directions according to one embodiment of the present invention.

FIG. 3*a* is a schematic cross-sectional diagram of a system for forming a structure from multiple waveguides (or struts) created using a single collimated beam or multiple collimated beams passing through multiple apertures located at the bottom of the channel. With reference to FIG. 3*a*, a system for forming an ordered 3D polymer micro-truss structure according to an embodiment of the present invention includes one or more collimated light sources 300, a channel/mold 310 having (or containing) photo-monomer 320 that will polymerize at a wavelength of collimated light beams provided by the light sources 300, and a patterning apparatus, such as a mask 330 with one or more apertures (open areas) 340. Each of the apertures 340 has a given shape and dimension substantially matching a cross-sectional geometry of a strut (e.g. waveguide 360*a*).

Continuing with FIG. 3*a*, the mask 330 rests on the transparent substrate (or transparent plate) 350 that includes the bottom of the channel/mold 310. In one embodiment, the mask 330 is made of a lightweight, flexible, and opaque material such as polyethylene terephthalate (PET) film. The transparent substrate 350 may be made of a material (such as quartz) that is transparent to the light emitted from the collimated light sources. In other embodiments, the transparent substrate 350 acts as the mask 330 (e.g., portions of the transparent substrate 350 are opaque while other portions are transparent). The photo-monomer 320 fills the channel 310 above the mask 330. In one embodiment, different thicknesses of micro-truss structures can be achieved by filling the channel (or mold) 310 with photo-monomer 320 to the desired height. Once the collimated light source is applied, the intersecting polymer waveguides 360*a* will grow upward from the surface of the mask 330 or the surface of the transparent substrate 350, terminating at the free (e.g., upper) surface of the photo-monomer 320 in the channel 310 to form struts of the micro-truss structure.

Figure 4B:
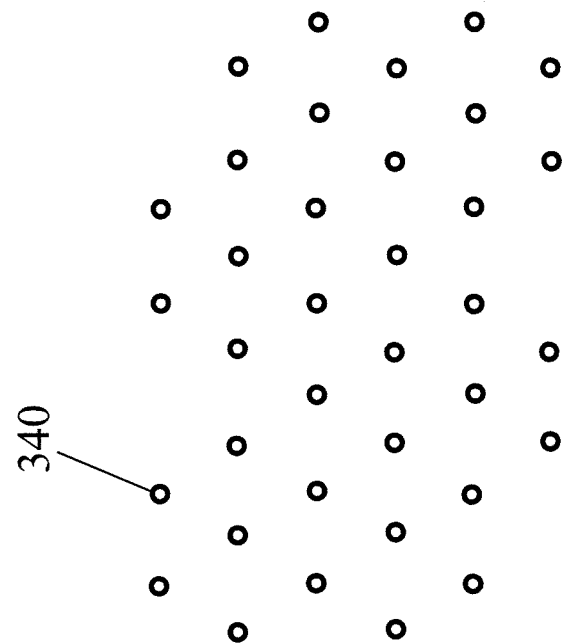
FIG. 4b illustrates a hexagonal mask pattern (or a hexagonal mask aperture pattern) according to an embodiment of the present invention.
Figure 4A:
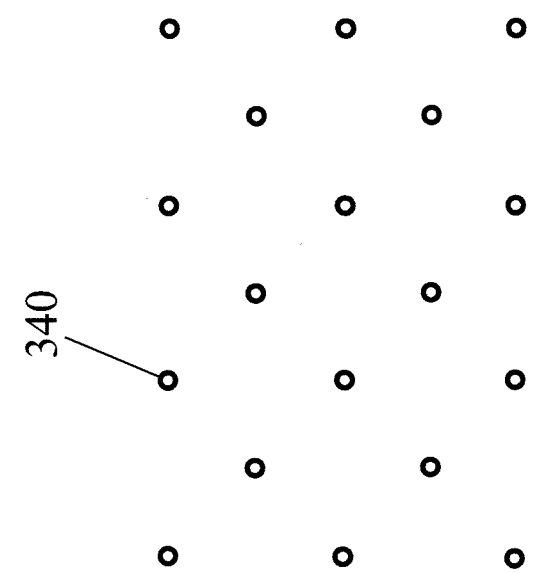
FIG. 4a illustrates a square mask pattern (or a square mask aperture pattern) according to an embodiment of the present invention.

Here, in FIG. 3*a*, a 3D network (or micro-truss structure 360) can be formed because the intersecting polymer waveguides 360*a* (or struts) will polymerize together, but will not interfere with waveguide propagation. Also, the spacing between the plurality of waveguides 360*a* (or struts) corresponds with the pattern of the plurality of apertures 340. The pattern of the apertures 340 may, for example, be in a square pattern as shown in FIG. 4*a* and/or in a hexagonal pattern as shown in FIG. 4*b*. The hole (aperture) spacing, i.e., distance between apertures 340 in the mask 330, and the number of waveguides 360 (or struts) formed from each of the apertures 340 will determine the open volume fraction (i.e. open space) of the formed ordered 3D micro-truss structure (or the formed open-cell polymer micro-truss structure).

As such, using the system of FIG. 3*a*, a three-dimensional, net-shape, ordered micro-truss structure 360 can be designed for various applications. The design parameters include: 1) the angle and pattern of the polymer struts with respect to one another, 2) the packing, or relative density of the resulting cell structure (or the open volume fraction), and 3) the cross-sectional shape and dimensions of the struts. Here, in one embodiment, the strut (or waveguide) diameter can range from 10 microns to 10 mm depending on the design criteria.

The inclination at which the first, second, and third struts extend may be determined by an angle α (see, e.g., FIG. 3*a*) at which the collimated light sources 300 are oriented with respect to the mask 330 such that the collimated light passes through the apertures 340 of the mask 330 at an angle α. Due to the refractive index change between air and the mask and monomer, in many instances the angles of inclinations at the first, second, and third struts will not be the same as α.

Figure 3B:
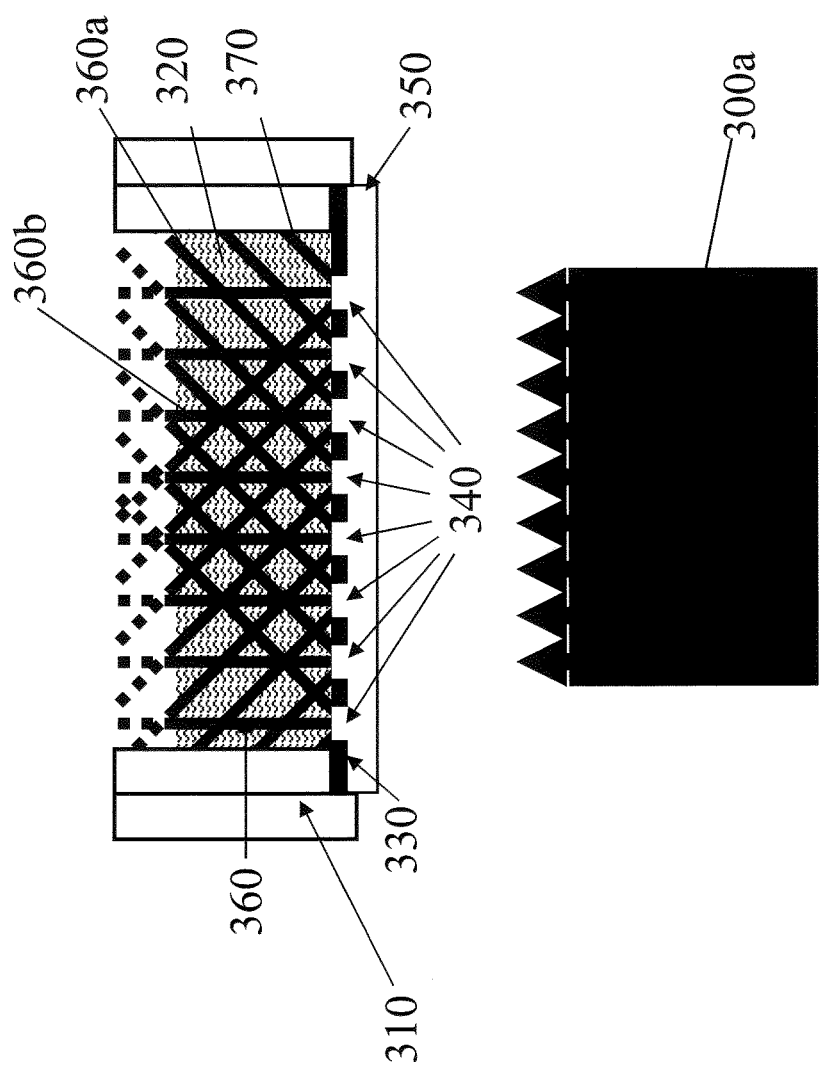

According to one embodiment of the present invention, the struts further include vertical struts 360*b* extending in a fourth direction with an inclination of substantially 90° (e.g., substantially perpendicular to the xz-plane). As illustrated in FIG. 3*b*, collimated light source 300*a* is oriented to emit light in a direction substantially perpendicular with respect to the mask 330.

In another embodiment, a single mask having a plurality of apertures which may have different sizes may be used, and collimated light aimed perpendicular to the plane of the mask or at an angle is selectively emitted through the apertures of the mask.

Referring, for example, to FIG. 3b, in some embodiments, at least one digital mask may be used in place of the mask 330 below, above, or to either side of the channel 370, or in any combination of these locations between the collimated light sources and the photo-monomer 320. A digital mask is a display device which can be controlled to become opaque at some locations and transparent at other locations to the wavelength of light used to polymerize the photo-monomer, such as a liquid crystal display (LCD). One such liquid crystal display mask is disclosed in A. Bertsch, P. Bernhard, and P. Renaud, (2001) "Microstereolithography: Concepts and applications," paper presented at the 8th International IEEE Conference on Emerging Technologies and Factory Automation, Vol. 2, pp. 289-99, the entire disclosure of which is incorporated herein by reference. In embodiments where the collimated light sources 300 are located below the channel, the digital mask is located between the collimated light sources 300 and the transparent substrate 350. Additionally, the digital mask can be configured on-the-fly to display any variation of aperture sizes and patterns to produce the desired micro-truss structure 360, eliminating the need for stopping fabrication to change masks. For example, the digital mask may be used to form differently sized apertures for the angled struts and the vertical struts.

Once formed, micro-truss structures have uses in a variety of fields, including advanced armor, heat exchange, light weight/high impact applications, etc. In many of these applications, it may be beneficial for the micro-truss structure to have a particular curvature that conforms to a surface where it will be used. For example in one embodiment, it may be beneficial for a micro-truss structure being used as armor to have a particular curvature that conforms to the outer surface of a military vehicle, or in another example, it may be beneficial for a micro-truss structure being used as a heat exchanger to comprise a particular curvature that conforms to the outside of an engine.

Figure 5:
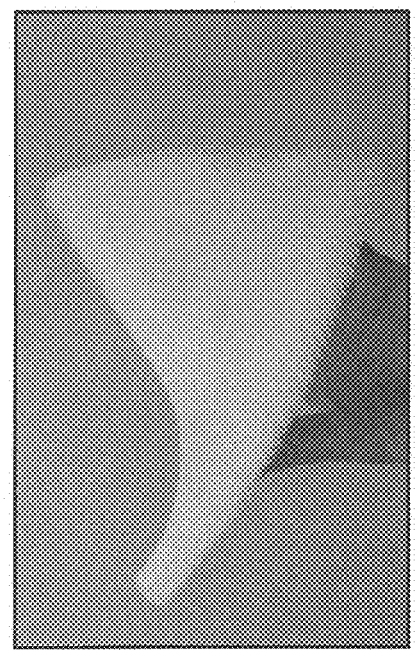
FIG. 5 is a photograph of a micro-truss structure according to one embodiment of the present invention.

In one embodiment, to form a three-dimensional, net-shape, ordered micro-truss structure, wherein the plurality of ordered unit cells within the micro-truss structure define a curved surface, the polymer micro-truss structure is first heated above its glass transition temperature ($T_g$). The glass transition temperatures of various polymers are widely available and would be known to one having ordinary skill in the art. After being heated above its glass transition temperature, the micro-truss structure is elastically deformed into a desired curvature or shape. Finally, the deformed micro-truss structure is thermally post-cured such that the polymer is no longer elastically deformable. In some embodiments, post-curing a micro-truss structure formed into a particular curvature may take approximately twenty-four hours at a temperature above 100° C. FIG. 5 is a photograph of a micro-truss structure that has been formed into a saddle shape and then thermally post-cured.

Figure 6:
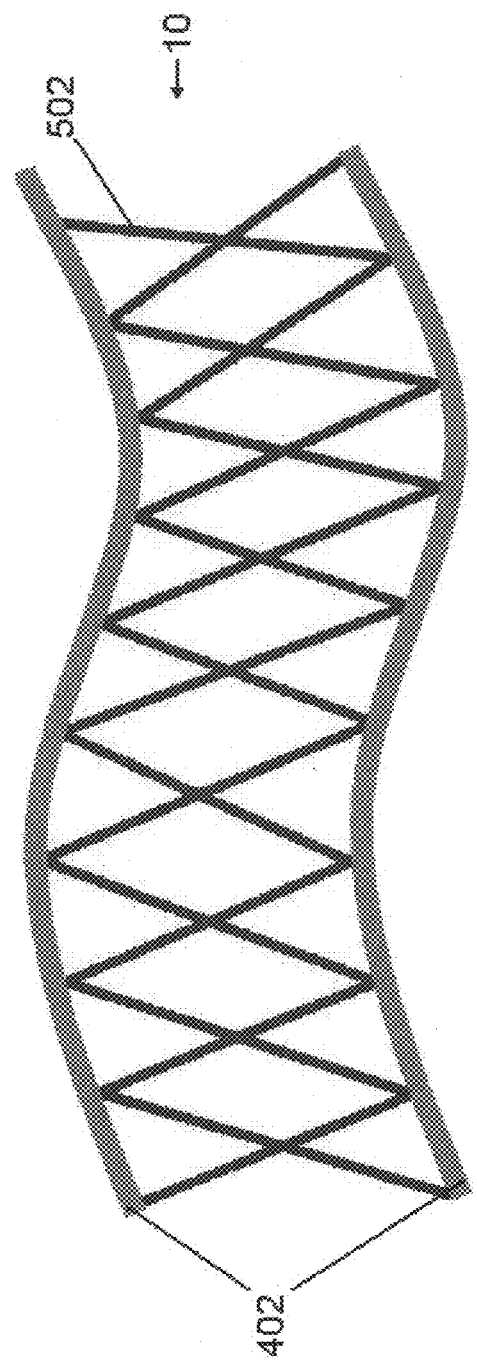
FIG. 6 is a schematic cross-sectional diagram of a micro-truss structure according to one embodiment of the present invention.

The micro-truss structure 10 depicted in FIG. 6 includes two facesheets 402, which have been attached to opposing sides of the micro-truss structure 10. The facesheets 402 may be attached either before or after the micro-truss structure 10 is formed into a particular curvature. The attachment of the facesheets 402 to the micro-truss structure 10 creates a sandwich structure, which may have additional strength, stiffness, and thermal conductivity properties. Sandwich structures are well suited for applications that require high flexural stiffness at a minimal weight. In other embodiments, either a single facesheet 402 or no facesheet 402 may be attached to the micro-truss structure 10. FIG. 5 depicts a curved micro-truss structure without facesheets.

In some embodiments, the micro-truss structure 10 (i.e., the curved (or "net-shape"), ordered micro-truss structure) which has been formed into a particular curvature, is coated with another material to form a structure. In some embodiments of the present invention, the radius of the curvature may be as small as the thickness of the micro-truss structure 10. For example, a micro-truss structure 10 that is 2 cm thick may have a radius of curvature as small as 2 cm. In one embodiment of the present invention, the polymer micro-truss structure is coated with a material selected from the group consisting of nickel (Ni), copper (Cu), gold (Au), silver (Ag), ruthenium (Ru), platinum (Pt), rhodium (Rh), cobalt (Co), iron (Fe), zinc (Zn), titanium (Ti), aluminum (Al), and combinations thereof. FIG. 6 depicts a micro-truss structure 10, which has been formed to a particular curvature and coated with a metal 502. Coating a micro-truss structure 10 with a metal may increase the strength, stiffness, and thermal conductivity of the micro-truss structure 10. This may have particular application in the field of heat exchangers.

Figure 7:
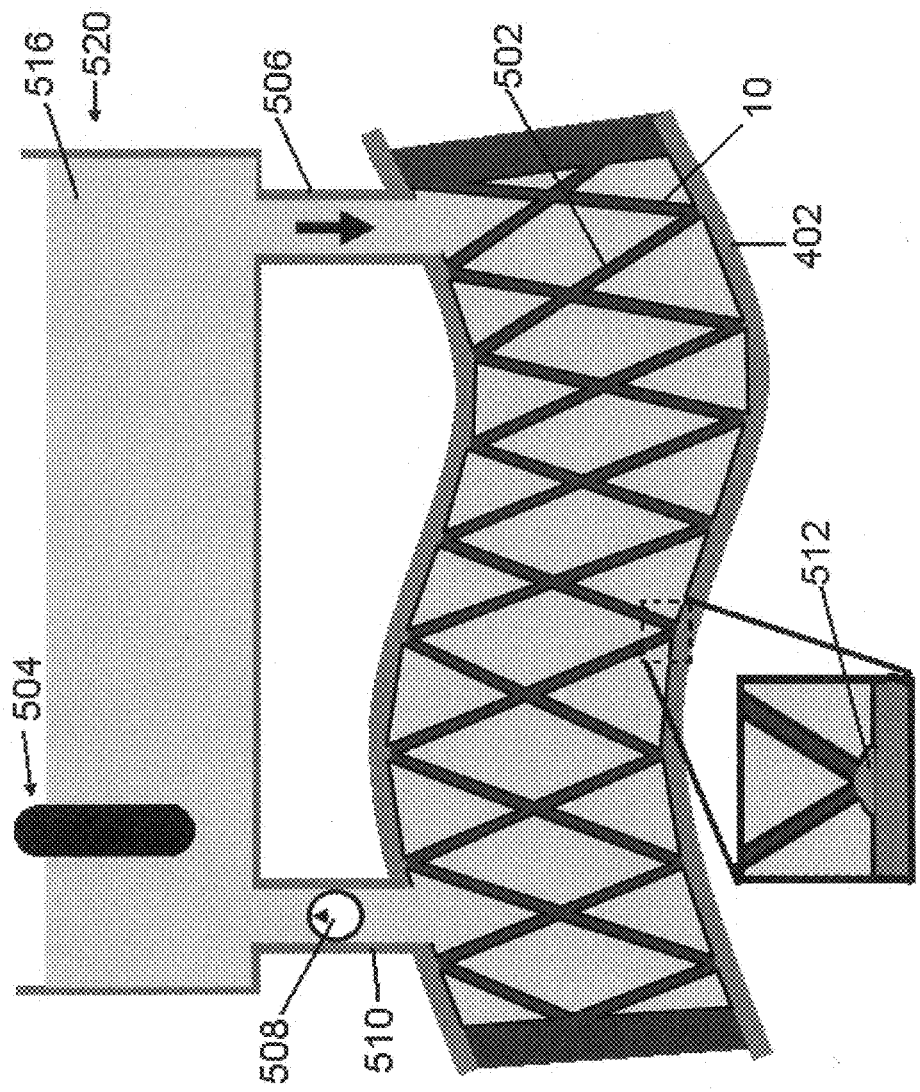
FIG. 7 is a schematic cross-sectional diagram of an apparatus for applying electroless deposition to a micro-truss structure according to one embodiment of the present invention.

FIG. 7 shows a schematic cross-sectional diagram of a micro-truss structure 10 being electroless plated according to one embodiment. This embodiment includes a heater 504 disposed within an electroless plating solution 516 contained within a reservoir 520. The solution 516 is in communication with the micro-truss structure 10 through a first channel 506 and a second channel 510. The second channel 510 includes a pump 508, which functions to cycle the electroless plating solution 516 from the reservoir 520 into the micro-truss structure 10. Prior to flowing the electroless plating solution 516 through the micro-truss structure 10, a catalyst for seeding electroless deposition onto the polymer micro-truss structure may be flowed through the micro-truss structure 10 using the same channels 506, 510 and pump 508 as depicted in FIG. 7. As the electroless plating solution 516 is cycled through the micro-truss structure 10, a metal coating 502 may be deposited upon the surface of the micro-truss structure 10. The electroless plating process may initially coat the polymer truss with a metallic film and, if continued for a long period of time, may completely fill the void space with metal. In this way, the thickness of the metal coating can be controlled by adjusting the duration of the electroless plating process to be longer for thicker coatings or shorter for thinner coatings.

FIG. 7 also includes a magnified view of a portion of the micro-truss structure 10 that is defined by a dotted square. The magnified portion depicts a connection point 512 between the micro-truss structure 10 and a faceplate 402. The faceplate 402 may be comprised of a metal. Prior to electroless deposition, the connection point 512 may include a polymer adhesive such as epoxy. A metal coating may be formed on the polymer adhesive during electroless plating. In some embodiments, this may be used to form a metallic bond between the faceplate 402 and the micro-truss structure 10. A metallic bond between the faceplate 402 and the micro-truss structure 10 may increase the thermal exchange between the faceplate 402 and the micro-truss structure 10 allowing for a more efficient heat exchange device.

Figure 8:
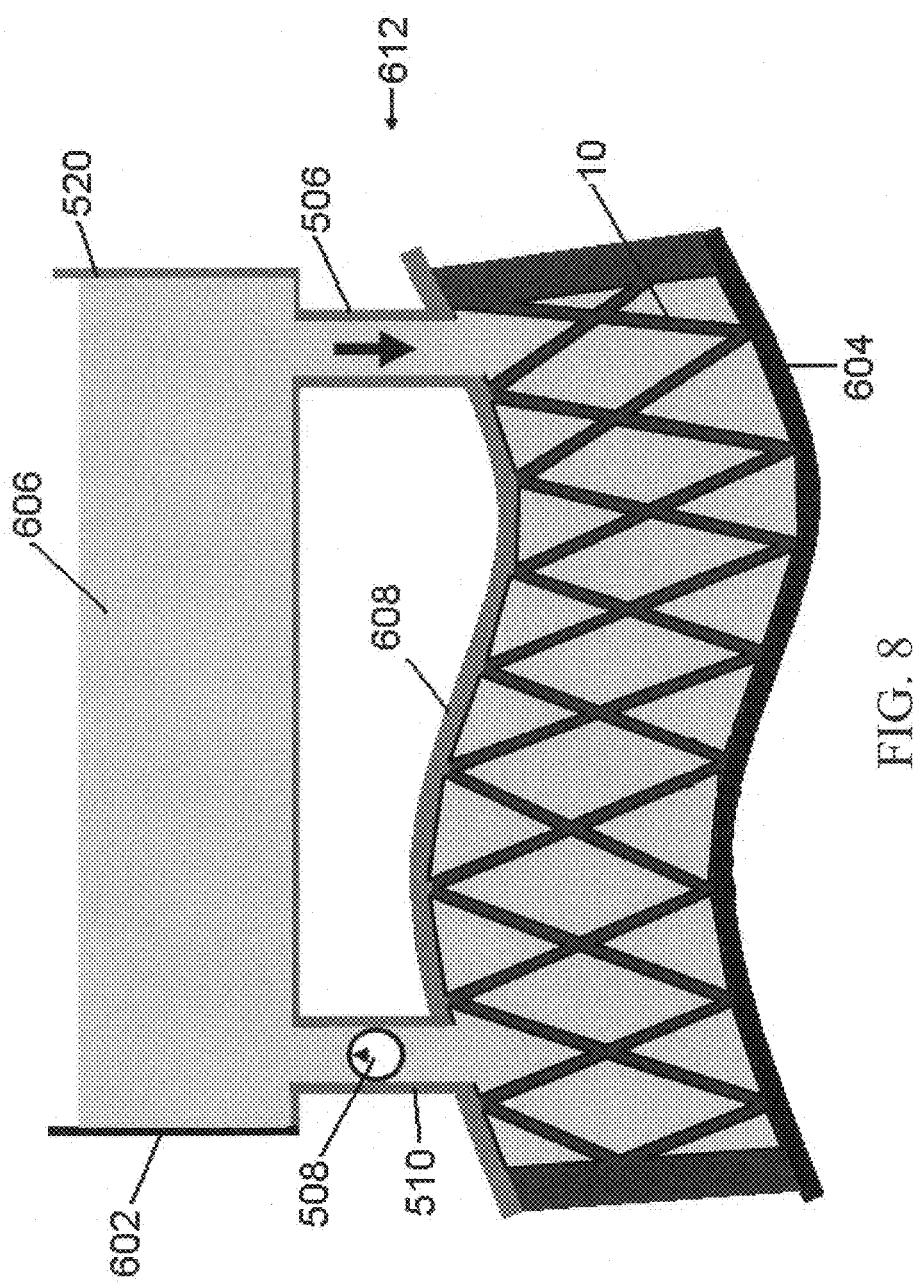
FIG. 8 is a schematic cross-sectional diagram of an apparatus for applying electrodeposition to a micro-truss structure according to one embodiment of the present invention.

In addition to electroless plating, electrodeposition may also be applied to the micro-truss structure 10 after it has been formed into a particular curvature. FIG. 8 shows a schematic cross-sectional diagram of an embodiment of a micro-truss structure 10 being electroplated. In some embodiments, the micro-truss structure 10 may first be electroless plated, as described above, to generate a sufficient conductive seed layer for electrodeposition to be applied. The apparatus for electrodeposition 612 depicted in FIG. 8 includes a pump 508, a first channel 506, a second channel 510, and a reservoir 520 containing an electroplating solution 606. Similar to the electroless plating apparatus depicted in FIG. 7, the pump 508 in FIG. 8 circulates fluid between the reservoir 520 and the micro-truss structure 10. Additionally, the apparatus for electrodeposition 612 includes a counter electrode 602, a working electrode 604, and an insulating facesheet 608. The working electrode 604 has an electrical connection with the electroless plated micro-truss structure 10 causing the entire micro-truss structure 10 to function as a working electrode 604. The electric field generated by the working electrode 604 and the counter electrode 602 may cause metal to deposit on the surface of the micro-truss structure 10.

In additional embodiments, after applying a metal coating to the micro-truss structure that has been formed into a particular curvature, the polymer micro-truss structure can be removed by burning or etching using, for example a strong base, leaving a hollow, metal micro-truss structure. According to one embodiment of the present invention, each of the hollow metal struts may have an inner diameter in the range of 10 microns to 10 mm and the thickness of the metal (or the wall thickness) may be in the range of 1 micron to 1 mm. The resulting metal micro-truss structure may have a relative density in the range 0.5% to 30% with respect to a solid metal block.

Figure 9:
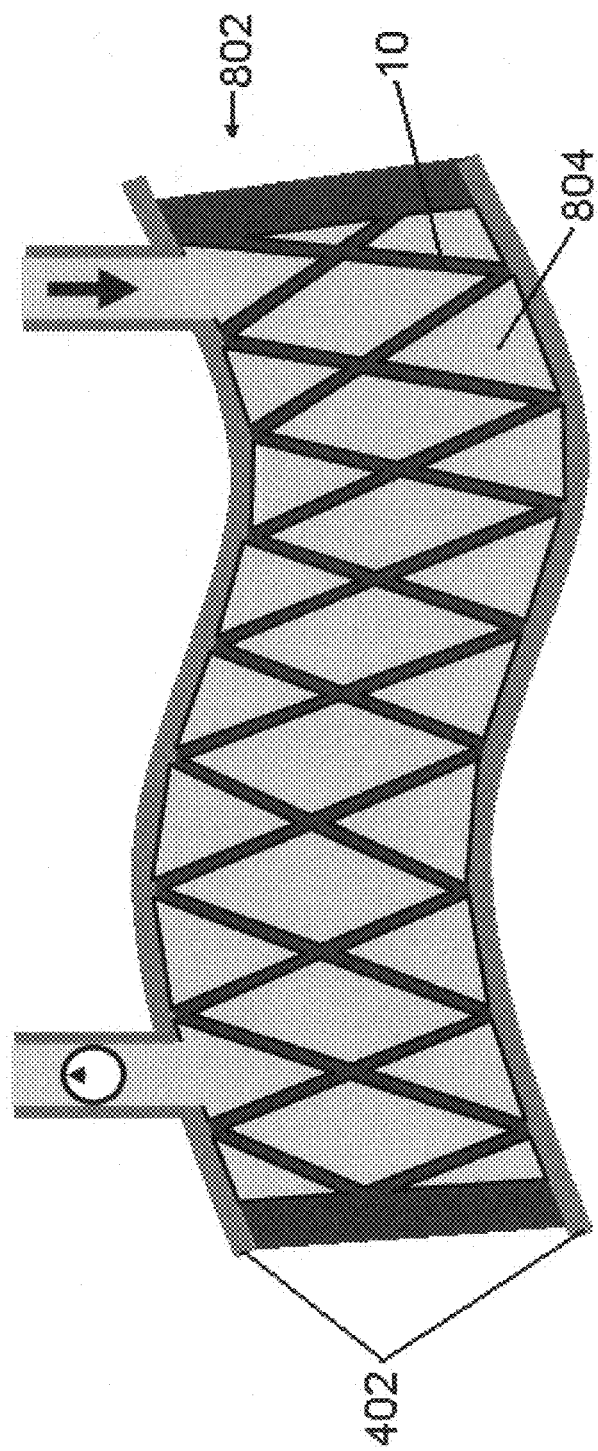
FIG. 9 is a schematic cross-sectional diagram of a micro-truss structure according to one embodiment of the present invention.

FIG. 9 shows a heat exchange device 802 including a metal-coated polymer micro-truss structure core 10 according to one embodiment of the present invention. The metal coating may have been applied to the micro-truss structure 10 through electroless deposition, electrodeposition, or some other coating method known in the art. The micro-truss structure 10 in this embodiment includes two facesheets 402 attached to the micro-truss structure 10. The facesheets 402 may be comprised of a metal and have a metallic connection with the micro-truss structure 10, which may increase the thermal conductivity of the overall heat exchange device 802.

In this embodiment, the micro-truss structure 10 has been formed to have a particular curvature, which may allow the heat exchange device 802 to conform to a particular surface where it will be used. In some embodiments, the micro-truss structure 10 may be formed to have a cylindrical shape to conform to the outside of a pipe. In other embodiments, the micro-truss structure 10 may be formed to have a saddle shape to conform to a similarly shaped apparatus. In general, the micro-truss structure 10 may be formed into any number of shapes to better conform to the surface where it will be applied.

The heat exchange device 802 may contain a working fluid 804, which is pumped from an attached apparatus (not shown) into the micro-truss structure 10 where it is cooled before being pumped back into the attached apparatus. In another embodiment, the heat exchange device 802 may contain a working fluid 804, which is pumped into the micro-truss structure 10 where it is heated before being pumped back into the attached apparatus (not shown).

Figure 10:
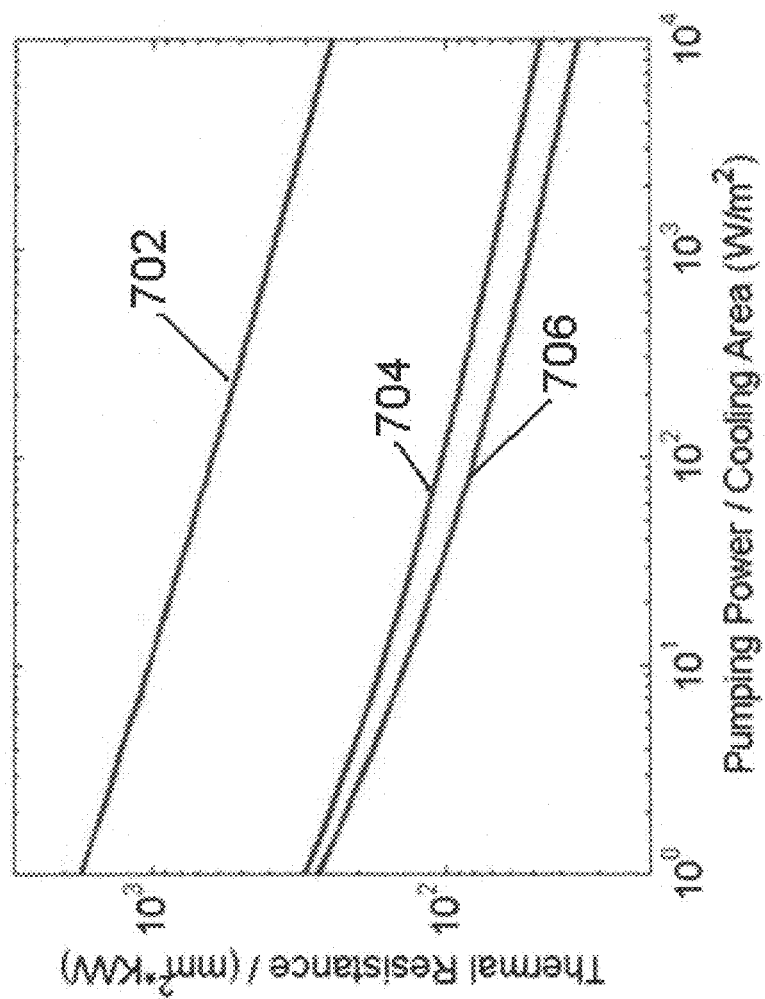
FIG. 10 is a graph depicting data related to select embodiments of the present invention.

FIG. 10 shows a graph which compares the thermal resistance of two metal-coated polymer micro-truss structure based cold plates 704, 706 to a polymer micro-truss structure based cold plate without a metal coating 702. The micro-truss structure analyzed in the graph has a core thickness of 25 mm, a polymer truss diameter of 170 microns, and uses water as a working fluid. It is believed that plating a micro-truss structure with 13 microns of copper 704 or 35 microns of copper 706 would increase their average thermal conductivity from ~0.4 W/(m*K) to 100 and 200 W/(m*K) respectively, resulting in a decrease in thermal resistance by approximately an order of magnitude at constant pumping power per cooling area. The increase in thermal conductivity would greatly enhance the ability of the micro-truss structure to function as a heat exchange device.

In addition to its potential uses as a heat exchanger, a micro-truss structure having a particular curvature could be used in a variety of different fields. Many of these uses may require that the micro-truss structure include particular materials. In some embodiments, the micro-truss structure may be formed into a particular curvature and then left without a coating. In other embodiments, after forming the micro-truss structure into a particular curvature and coating the micro-truss structure, the polymer from the micro-truss structure may be removed and replaced with another material. Examples of materials that may function as either a micro-truss structure material or as coatings include polymers, carbons/graphite, metals, and ceramics. These materials may be applied as a coating or incorporated into the micro-truss structure material after the structure has been formed to a particular curvature and cured to maintain that curvature. Methods of applying the coating to the structure or incorporating the material into the micro-truss structure include but are not limited to electrodeposition, electroless deposition, metal salt reduction, metal casting, gel casting, slip casting, sol-gel, chemical vapor deposition, carbide reactions, and preceramic polymers. Each of these methods is disclosed in Jacobsen et al., "Composite Structures With Ordered Three-Dimensional (3D) Continuous Interpenetrating Phases," U.S. application Ser. No. 12/008,479, filed Jan. 11, 2008, which is incorporated by reference herein in its entirety.

Figure 11:
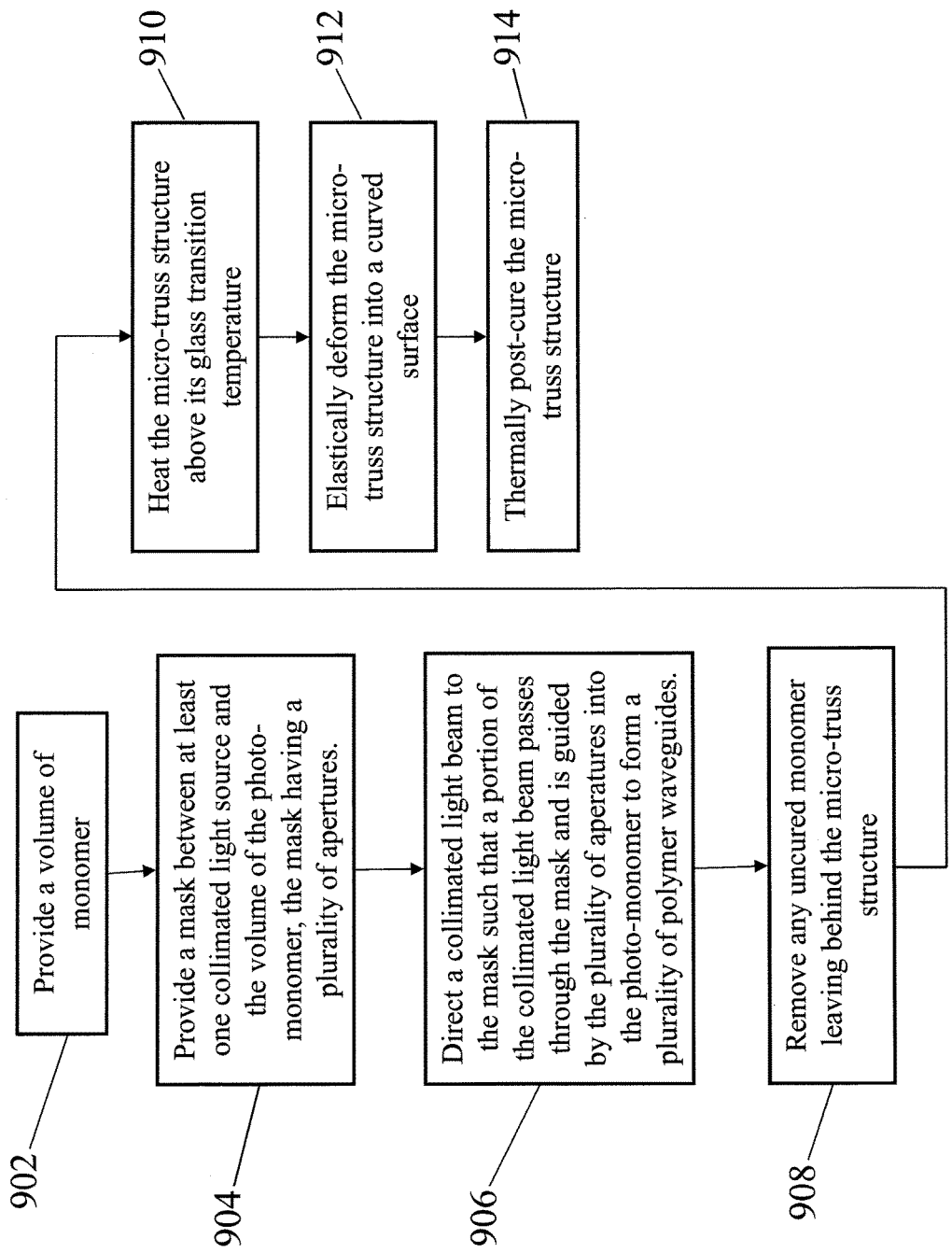
FIG. 11 is a process flow diagram for forming a three-dimensional structure according to an embodiment of the present invention.

FIG. 11 shows a method of forming a three-dimensional, net-shape, ordered micro-truss structure according to an embodiment of the present invention. As illustrated in FIG. 11, a volume photo-monomer is provided in block 902. In block 904, a mask is provided between at least one collimated light source and the volume of the photo-monomer, the mask having a plurality of apertures. A collimated light beam is directed onto the mask in block 906 such that a portion of the collimated light beam passes through the mask and is guided by the plurality of apertures into the photo-monomer to form a plurality of polymer waveguides. After forming a plurality of polymer waveguides, in block 908 the uncured monomer is removed leaving behind the micro-truss structure (i.e., the partially cured, three-dimensional, ordered micro-truss structure).

In block 910 the micro-truss structure is heated above its glass transition temperature. Once above its glass transition temperature, the micro-truss structure may be elastically deformed into a curved structure as recited in block 912. After the micro-truss structure is deformed into a desired curvature or shape, the micro-truss structure is thermally post-cured in block 914 (to thus form the curved (or (net-shape"), three-dimensional, ordered micro-truss structure). In some embodiments, an additional step of attaching a faceplate to a side of the micro-truss structure may be performed prior to block 910, prior to block 912, prior to block 914, or after block 914.

Figure 12:
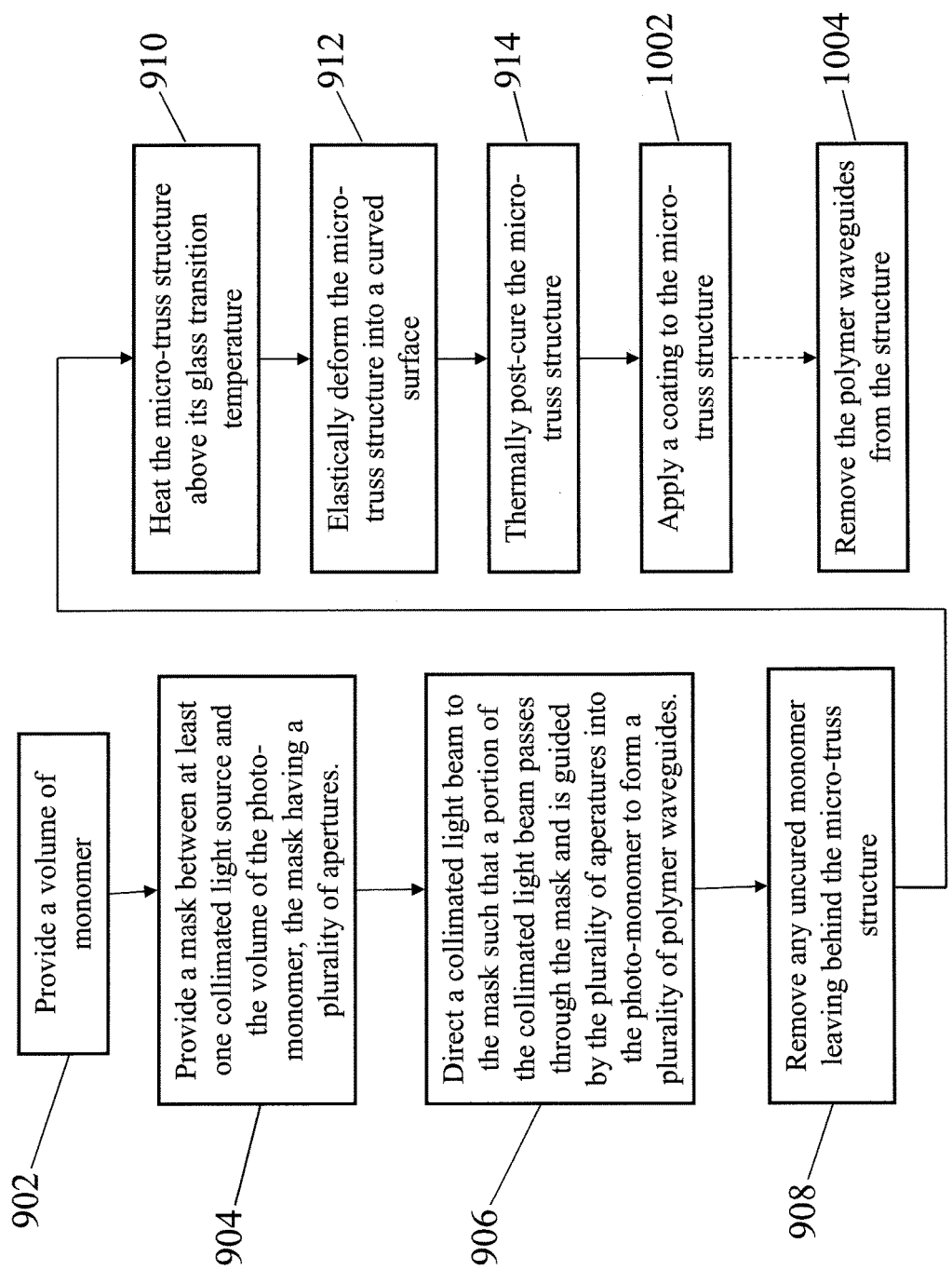
FIG. 12 is a process flow diagram for forming a three-dimensional structure according to other embodiments of the present invention.

FIG. 12 depicts additional embodiments of the method described in FIG. 11. In the embodiment described in block 1002, a coating may be applied to the micro-truss structure. In some embodiments, the coating may be a metallic coating, and it may be applied through electroless deposition or electrodeposition. In some embodiments, after a coating is applied to the micro-truss structure, in block 1004 the polymer waveguide may be removed through etching, burning, or some other method known in the art. Upon removing the polymer waveguides, the micro-truss structure may comprise hollow tubes. As depicted in FIG. 12 the dotted line connecting block 1002 to block 1004 designates that in some embodiments the process described in block 1002 may be applied without applying the process described in block 1004.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A curved, three-dimensional, ordered micro-truss structure comprising:
    a plurality of first struts extending along a first direction;
    a plurality of second struts extending along a second direction;
    a plurality of third struts extending along a third direction, wherein the first, second, and third struts interpenetrate one another at a plurality of nodes,
    wherein the pluralities of first struts, second struts, third struts, and nodes form a plurality of ordered unit cells within the micro-truss structure, and
    wherein the plurality of ordered unit cells define a curved surface; and
    a facesheet coupled to a side of the plurality of ordered unit cells,
    wherein the plurality of ordered unit cells are curved into a shape having a radius of curvature substantially equal to a thickness of the plurality of ordered unit cells.

2. The curved, three-dimensional, ordered micro-truss structure of claim 1, wherein the pluralities of first struts, second struts, and third struts comprise a polymer.

3. The curved, three-dimensional, ordered micro-truss structure of claim 1, further comprising a coating on a surface of the pluralities of first struts, second struts, and third struts.

4. The curved, three-dimensional, ordered micro-truss structure of claim 3, wherein the coating comprises a material selected from the group consisting of nickel (Ni), copper (Cu), gold (Au), silver (Ag), ruthenium (Ru), platinum (Pt), rhodium (Rh), cobalt (Co), iron (Fe), zinc (Zn), titanium (Ti), aluminum (Al), and combinations thereof.

5. The curved, three-dimensional, ordered micro-truss structure of claim 1, wherein the facesheet comprises a metal.

6. The curved, three-dimensional, ordered micro-truss structure of claim 5, wherein the plurality of ordered unit cells are coated with a metal to form a metallic connection between the facesheet and the plurality of ordered unit cells.

7. The curved, three-dimensional, ordered micro-truss structure of claim 1, wherein the first struts, second struts, third struts, and nodes comprise a material selected from the group consisting of metal, ceramic, polymer, graphite, and combinations thereof.

8. The curved, three-dimensional, ordered micro-truss structure of claim 1, wherein the first struts, second struts, third struts, and nodes are comprised of substantially hollow tubes.

9. The curved, three-dimensional, ordered micro-truss structure of claim 1, wherein the third direction is different than the second direction, and wherein the second direction is different than the first direction.

10. The curved, three-dimensional, ordered micro-truss structure of claim 1, further comprising a plurality of vertical struts extending along a vertical direction, the plurality of vertical struts interpenetrating the pluralities of first struts, second struts, and third struts at the plurality of nodes.

11. The curved, three-dimensional, ordered micro-truss structure of claim 1, further comprising a plurality of fourth struts extending along a fourth direction.

12. The curved, three-dimensional, ordered micro-truss structure of claim 1, wherein the facesheet is a first facesheet coupled to a first side of the plurality of ordered unit cells, and wherein the curved, three-dimensional, ordered micro-truss structure further comprises a second facesheet coupled to a second side of the plurality of ordered unit cells opposite to the first side.

13. The curved, three-dimensional, ordered micro-truss structure of claim 1, wherein the plurality of ordered unit cells has a saddle shape.

14. The curved, three-dimensional, ordered micro-truss structure of claim 1, wherein the plurality of ordered unit cells has a cylindrical shape.

15. The curved, three-dimensional, ordered micro-truss structure of claim 1, wherein the radius of curvature is approximately 2 cm.

16. The curved, three-dimensional, ordered micro-truss structure of claim 5, further comprising:
    a metal coating on the plurality of ordered unit cells;
    a plurality of adhesive connection points connecting the facesheet to the plurality of ordered unit cells; and
    a metal coating on each of the plurality of adhesive connection points, wherein the metal coating forms a metallic bond between the facesheet and the metal coating on the plurality of ordered unit cells.

17. A heat exchange device comprising the curved, three-dimensional, ordered micro-truss structure of claim 1.

18. The heat exchange device of claim 17, wherein the facesheet comprises a first facesheet coupled to a first side of the plurality of ordered unit cells, the first facesheet defining a first opening and a second opening;
    and further comprising: a second facesheet coupled to a second side of the plurality of ordered unit cells opposite to first side;
    a metal coating on the plurality of ordered unit cells;
    a first channel connected to the first opening in the first facesheet; and
    a second channel connected to the second opening in the second facesheet;
wherein the first channel is configured to direct a working fluid into the plurality of ordered unit cells and the second channel is configured to direct the working fluid out of the plurality of ordered unit cells.

* * * * *